United States Patent [19]

Hirota et al.

[11] Patent Number: 4,778,505
[45] Date of Patent: Oct. 18, 1988

[54] METHOD OF MOLDING GLASS BODY

[75] Inventors: Shinichiro Hirota; Kishio Sugawara; Tetsuro Izumitani, all of Tokyo, Japan

[73] Assignee: Hoya Corporation, Tokyo, Japan

[21] Appl. No.: 155,880

[22] Filed: Feb. 16, 1988

Related U.S. Application Data

[63] Continuation of Ser. No. 879,142, Jun. 26, 1986, abandoned.

[51] Int. Cl.$^4$ .............................................. C03B 23/00
[52] U.S. Cl. .......................................... 65/102; 65/64; 65/77; 65/104; 65/268; 65/275; 65/286; 65/321
[58] Field of Search ..................... 65/64, 104, 102, 68, 65/77, 268, 275, 286, 321

[56] References Cited

U.S. PATENT DOCUMENTS

| | | | |
|---|---|---|---|
| 4,398,935 | 8/1983 | Smulders et al. | 65/64 |
| 4,435,200 | 3/1984 | Joorman et al. | 65/102 X |
| 4,591,373 | 5/1986 | Sato et al. | 65/102 X |

FOREIGN PATENT DOCUMENTS

| | | | |
|---|---|---|---|
| 3443607 | 6/1985 | Fed. Rep. of Germany | 65/64 |
| 1021927 | 1/1986 | Japan | 65/102 |

*Primary Examiner*—Arthur Kellogg
*Attorney, Agent, or Firm*—Blakely, Sokoloff, Taylor & Zafman

[57] ABSTRACT

According to a method of molding a glass body, a glass preform is placed between upper and lower molds of a mold assembly. The mold assembly is then heated to a predetermined heating temperature falling within a heating temperature range corresponding to a glass viscosity range of the glass preform of $10^8$ to $10^{10.5}$ poise. A pressure high enough to mold the glass preform is applied between the upper and lower molds when the glass preform is at the predetermined heating temperature, so that an unfinished glass molded body is formed. The pressure is released, and the unfinished glass molded body and the mold assembly are gradually cooled to a temperature within a glass viscosity range of $10^{11.5}$ to $10^{14}$ poise while the unfinished glass molded body is held in the mold assembly. A glass molded body is then released from the mold assembly.

9 Claims, 3 Drawing Sheets

METHOD OF MOLDING GLASS BODY

This is a continuation of application Ser. No. 879,142 filed June 26, 1986, now abandoned.

BACKGROUND OF THE INVENTION

The present invention relates to a method of molding a glass body which does not necessarily require grinding or polishing after molding. A glass molded body is prepared by transferring optical mirror surfaces of a mold assembly to surfaces of the glass body and can be used as an aspheric glass lens as well as a spherical glass lens.

A conventional method of molding a glass body is known wherein a special material is used for a main body of a mold assembly and surfaces of the molded body, the molded surfaces are constituted by optical mirror surfaces which do not require grinding or polishing after molding, and molding is performed in a non-oxidizing atmosphere.

A method of molding a glass body, as described in U.S. Pat. No. 3,833,347 includes steps (a) to (h): (a) glass mass is placed in a mold assembly; (b) a chamber surrounding the mold assembly is evacuated and a non-oxidizing gas is introduced in the chamber; (c) the temperature of the mold assembly is increased to about a glass transformation temperature (the temperature corresponding to a viscosity of $10^{7.65}$ poise) and is kept at this temperature for 1 to 5 minutes; (d) the mold assembly is pressed to mold a glass body; (e) the load state is maintained while the molded glass body is not deformed, and the temperature of the mold assembly is decreased below the glass transformation temperature; (f) the load is removed; (g) the temperature of the mold assembly is further decreased to about 300° C. so as to prevent the oxidation of the mold assembly; and (h) the mold assembly is opened to remove the resultant glass lens.

According to the method described in U.S. Pat. No. 3,833,347, the temperature of the mold assembly is changed from the glass transformation temperature when heated to about 300° C. when cooled by several hundreds of degrees centigrade. If an identical mold assembly is used to continuously manufacture glass lenses, a molding cycle time required for manufacturing one glass lens is greatly prolonged. In addition, heat efficiency is also degraded. Further, since the mold assembly is in direct contact with and heated by the glass body for a long period of time, the inner surfaces of the mold assembly are roughened to shorten the service life thereof.

SUMMARY OF THE INVENTION

It is, therefore, a principal object of the present invention to provide a method of molding a glass body, wherein a molding cycle time can be shortened to improve heat efficiency.

In order to achieve the above object of the present invention, there is provided a method of molding a glass body, comprising the steps of: placing a lens preform between upper and lower molds of a mold assembly, the upper and lower molds being located opposite each other; heating the mold assemmbly to a predetermined heating temperature falling within a heating temperature range corresponding to a glass viscosity range of the glass preform of $10^8$ to $10^{10.5}$ poise; applying a pressure high enough to mold the glass preform between the upper and lower molds when the glass preform is heated at the predetermined heating temperature, so that an unfinished glass molded body is formed from the glass preform; releasing the pressure and gradually cooling the unfinished glass molded body and the mold assembly to a predetermined cooling temperature falling within a cooling temperature range corresponding to a glass viscosity range of $10^{11.5}$ to $10^{14}$ poise while the unfinished glass molded boy is held in the mold assembly; releasing a glass molded body from the mold assembly; placing the next glass preform between the upper and lower molds of the mold assembly kept in a temperature between the predetermined cooling temperature and the predetermined heating temperature; and performing steps of heating, pressure-applying, pressure releasing, cooling, and release of the glass molded body, whereby glass molded bodies are provided continuously by supplying glass preforms continuously.

DESCRIPTION OF THE PREFERRED EMBODIMENT

A preferred embodiment of the present invention will be described in detail with reference to the accompanying drawings.

A molding apparatus used in this embodiment will be described with reference to FIGS. 1 to 5.

Figure 1:
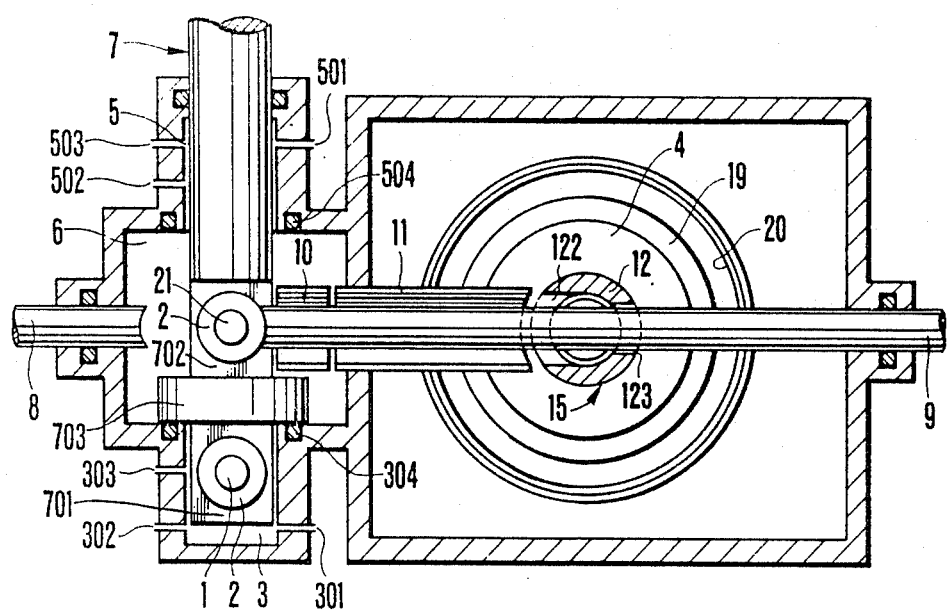
FIG. 1 is a cross-sectional view of a molding apparatus showing a state wherein a molded glass body is transferred from a press chamber to an intermediate chamber, and a state wherein the next glass preform is placed in a reception chamber according to a first example of a method of the present invention.
Figure 2:
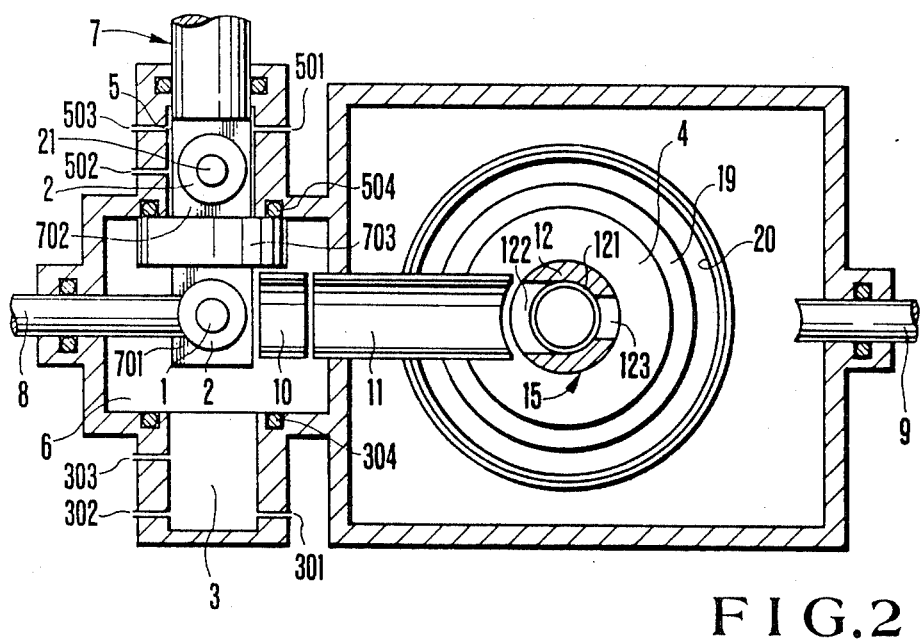
FIG. 2 is a cross-sectional view of the molding apparatus showing a state wherein the glass molded body is transferred into a rapid cooling/delivery chamber, and a state wherein the next glass preform is transferred into the intermediate chamber but immediately before it is transferred into the press chamber according to the first example.
Figure 3:
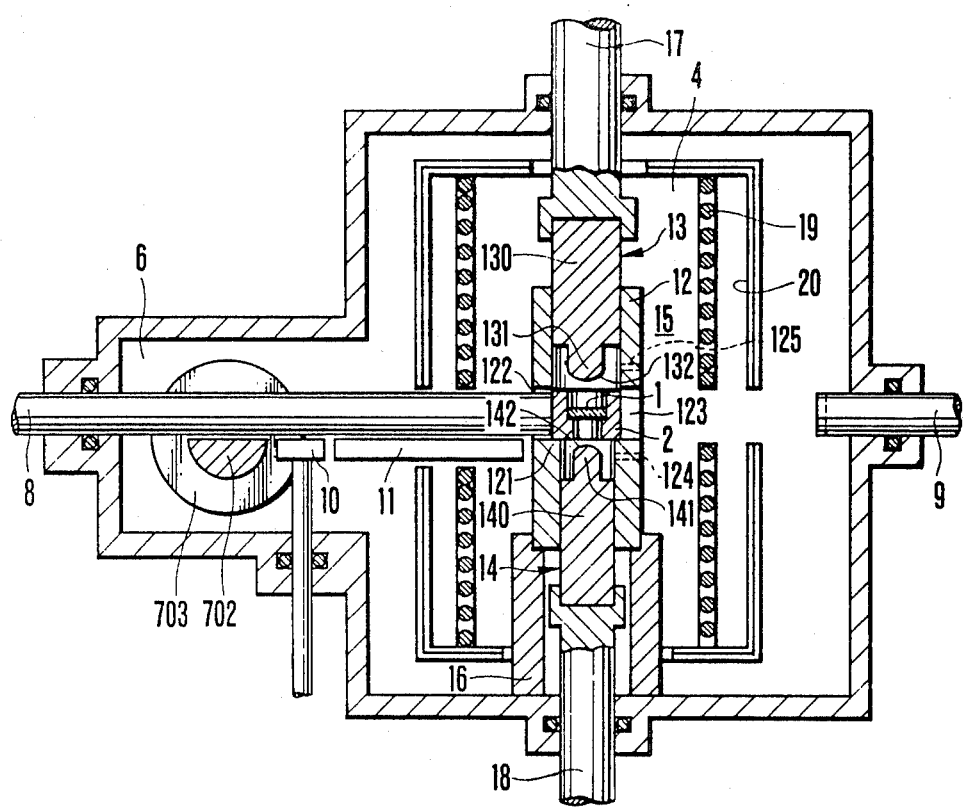
FIG. 3 is a longitudinal sectional view of the molding apparatus showing a state wherein the glass preform is transferred into the press chamber but immediately before the preform is molded.
Figure 4:
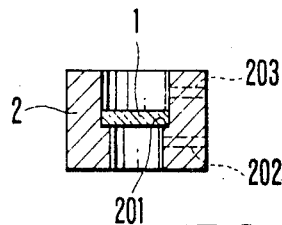
FIG. 4 is an enlarged sectional view showing a state wherein the glass preform is placed on a stepped inner surface of a ring holder.
Figure 5:
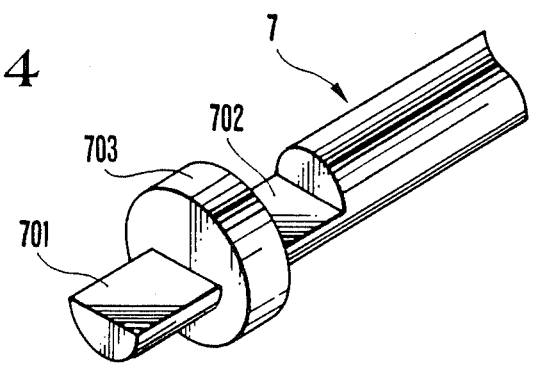
FIG. 5 is a perspective view showing a transfer tool.
Figure 6:
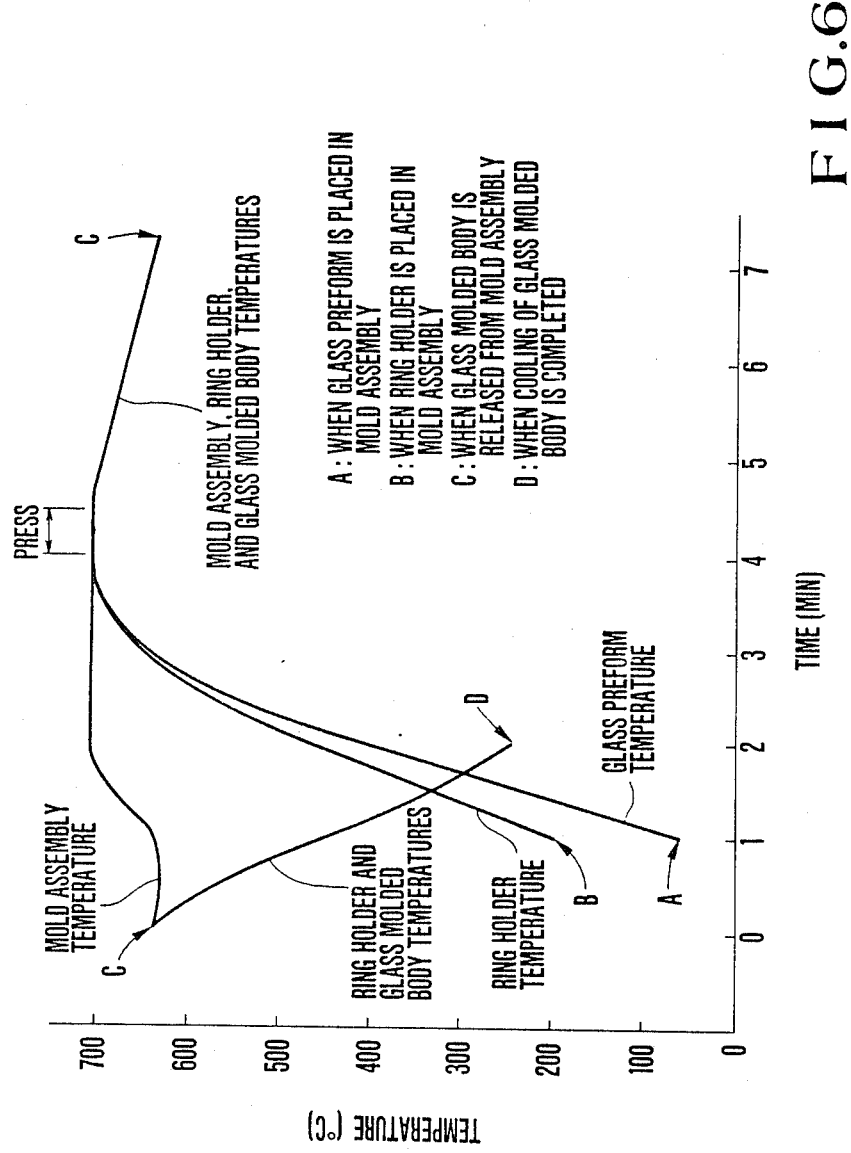
FIG. 6 is a graph showing the temperature changes in the glass preform, the ring holder, and the mold assembly as a function of time according to the first example of the present invention.

FIG. 1 shows a state wherein a ring holder 2 supporting a glass molded body 21 thereon is transferred by a push rod 9 from a press chamber 4 to an intermediate chamber 6, and a state wherein another ring holder 2 supporting a next glass preform 1 is placed in a reception chamber 3. FIG. 2 shows a state wherein the glass molded body 21 is transferred into a rapid cooling/delivery chamber 5 and a state wherein the glass preform 1 is transferred into the intermediate chamber 6 but immediately before the preform 1 is transferred into the press chamber 4. FIG. 3 shows a state wherein the ring holder 2 supporting the glass preform 1 is transferred by a push rod 8 into the press chamber 4 and is placed on the stepped surface 121 of a sleeve 12, but immediately before it is molded. FIG. 4 shows a state wherein the glass preform 1 is placed on an inner stepped surface 201 of the ring holder 2. FIG. 5 shows a transfer tool 7.

The "glass preform" is a glass body preformed in a fundamental shape for providing a glass molded body after molding. The fundamental shape is a disk-like, columnar, or spherical shape of a substantially identical volume if a convex or concave lens is to be formmed.

A molding atmosphere is preferably a non-oxidizing atmosphere, e.g., a reduction gas mixed with $H_2$ gas or an inert gas such as $N_2$ gas in order to protect the glass moding surfaces 132 and 142 of upper and lower molds 13 and 14 constituting a mold assembly 15.

The molding apparatus comprises the reception chamber 3 for receiving the ring holder 2 which supports the glass preform 1 thereon, the press chamber 4 for performing molding, and the rapid cooling/delivery chamber 5. The reception chamber 3, the press chamber 4, and the rapid cooling/delivery chamber 5 can communicate with each other through the intermediate chamber 6. The delivery and reception chambers 5 and 3 are located at the front (upper position in FIG. 1 or 2) and rear (lower position in FIG. 1 or 2) positions, interposing the intermediate chamber 6 therebetween. The press chamber 4 is located to the right of the intermediate chamber 6, as shown in FIG. 1 or 2. Even after the glass preform 1 is formed as the glass molded body 21, it is always placed on the inner stepped surface 201 of the ring holder 2, as shown in FIG. 4. The inner stepped portion 201 is formed at a boundary between the large- and small-diameter portions of the ring holder 2. The ring holder 2 supported by the transfer tool 7 is transferred in the order of the reception chamber 3, the intermediate chamber 6, the press chamber 4, the intermediate chamber 6, and the rapid cooling/delivery chamber 5. As shown in FIG. 5, the transfer tool 7 has first and second tables 701 and 702 for supporting the ring holders 2, and a disk-like partition plate 703 formed between the first and second tables 701 and 702. The transfer tool 7 is slidably fitted in the reception chamber 3 and the rapid cooling/delivery chamber 5. A gas mixture of 2% $H_2$ and 98% $N_2$ is supplied to all chambers including the press chamber 4 before the reception chamber 3 or the rapid cooling/delivery chamber 5 is partitioned by the partition plate 703. The gas mixture is supplied in the following manner. The partition plate 703 is located near the center of the intermediate chamber 6 so that all the chambers communicate with each other. Air is exhausted from the reception chamber 3 through an exhaust hole 301, and the gas mixture is then supplied to all the chambers through a gas supply hole 302. A pressure control hole 303 is connected to a gas control valve (not shown) to control a gas pressure in the chambers. An exhaust hole 501, a gas supply hole 502, and a gas control hole 503, having the same functions as those of the holes 301, 302, and 303, are provided in the rapid cooling/delivery chamber 5.

In the reception chamber 3 in FIG. 1 and the rapid cooling/delivery chamber 5 in FIG. 2, partition plates 703 are brought into tight contact with the inlet ports of the chambers 3 and 5 through O-rings 304 and 504, respectively, thereby obtaining the hermetic state. Even if the chambers 3 and 5 are kept in the hermetic state, gas can be supplied thereto.

The molding apparatus includes the push rod 8 for inserting the ring holder 2 from the intermediate chamber 6 to the press chamber 4, the push rod 9 for inserting the ring holder 2 from the press chamber 4 to the intermediate chamber 6, and rails 10 and 11. All these members are used to transfer the glass preform 1 on the ring holder 2 from the intermediate chamber 6 to the press chamber 4 and the glass molded body 21 from the press chamber 4 to the intermediate chamber 6. The rail 10 can be moved downward so as not to interfere back-and-forth movement of the partition plate 703 of the transfer tool 7 thereacross.

The mold assembly 15 including the sleeve 12, the upper mold 13, and the lower mold 14 is arranged in the press chamber 4, as best shown in FIG. 3. The outer diameter (18 mm) of a mold body 130 of the upper mold 13 is larger than that (16 mm) of a mold body 140 of the lower mold 14. The upper and lower mold bodies 130 and 140 are slidably fitted in the sleeve 12. Projections 131 and 141 having glass molding surfaces 132 and 142 at their front ends are fixed on the bodies 130 and 140, respectively. The outer diameter of the projection 131 is larger than that of the projection 141. The inner surface of the sleeve 12 has two inner diameters (18 mm and 16 mm) respectively corresponding to the outer diameters of the bodies 130 and 140 so that a stepped surface 121 is formed at the intermediate portion thereof and the ring holder 2 is placed on the stepped surface 121. The ring holder 2 has inner surface portions of different diameters so as to receive the projection 131 of the body 130 of the upper mold 13 and the projection 141 of the body 140 of the lower mold 14, while interposing the stepped surface 201 therebetween. The upper inner surface portion of the ring holder 2 substantially corresponds to the outer diameter of the projection 131 having the glass molding surface 132. The lower inner surface portion of the ring holder 2 substantially corresponds to the outer diameter of the projection 141 having the glass molding surface 142. Openings 122 and 123 are formed in the side wall portions of the sleeve 12 above the stepped surface 121 to insert and transfer the ring holder 2 and the push rods 8 and 9. The material of the bodies 130 and 140 is tungsten carbide. One-micron thick silicon nitride ($Si_3N_4$) layers are respectively formed by CVD (Chemical Vapor Deposition) on the glass molding surfaces 132 and 142 of the upper and lower molds 13 and 14. The material of the sleeve 12 is also tungsten carbide.

The sleeve 12 is supported by a support tool 16, and the bodies 130 and 140 are respectively mounted on push rods 17 and 18. In order to mold the glass preform 1, the push rods 17 and 18 are respectively moved downward and upward to bring the glass molding surfaces 132 and 142 into contact with the upper and lower surfaces of the glass preform 1. A pressure is then applied on the upper mold 13 through the push rod 17. A resistor heater 19 for heating the mold assembly 15 and a reflector 20 for reflecting heat radiation are arranged around the mold assembly 15.

A method of the present invention using the molding apparatus described above will be described with reference to FIGS. 1 to 5, and FIG. 6 showing temperature changes in the glass preform 1, the ring holder 2, and the mold assembly 15 as a function of time. The present invention will be described in detail by way of its examples.

EXAMPLE 1

In Example 1, double-concave lenses, each having a diameter of 10 mm and a central thickness of 1.5 mm, were continuously prepared by using disk-like members of optical glass LaK 14 (glass transformation temperature: 640° C.) as glass preforms 1, each having a diameter of 9.8 mm and a thickness of 2 mm.

As shown in FIG. 1, the transfer tool 7 was transferred forward and the partition plate 703 was brought into tight contact with the inlet port of the reception chamber 3 to seal it off from the intermediate chamber 6. Thereafter, the glass preform 1 exposed at room temperature was placed on the ring holder (a temperature of about 200° C.) used in the previous molding cycle while the reception chamber 3 was opened. This ring holder 2 was placed on the first table 701 of the transfer tool 7. After the reception chamber 3 was exhausted, a gas mixture of 2% $H_2$ and 98% $N_2$ was filled therein. In this state, the gas mixture has been also present in the press chamber 4, the rapid cooling/delivery chamber 5, and the intermediate chamber 6 in the previous molding cycle.

As shown in FIG. 2, the transfer tool 7 was withdrawn to bring the partition plate 703 into tight contact with the inlet port of the delivery chamber 5. The ring holder 2 supporting the glass preform 1 thereon was temporarily transferred back to the intermediate chamber 6, and the rail 10 was moved upward to the same level as the rail 11. Thereafter, the ring holder 2 was transferred into the press chamber 4 by the push rod 8.

As shown in FIG. 3, the ring holder 2 supporting the glass preform 1 thereon was transferred by the push rod 8 into the press chamber 4 through the rails 10 and 11, and was placed on the stepped surface 121 of the sleeve 12 of the mold assembly 15. When the glass preform 1 was placed on the mold assembly 15 (a lapse of one minute in FIG. 6), the temperature of the upper and lower molds 13 and 14 was gradually decreased from a press temperature at 700° C. of the previous molding cycle to a cooled temperature of 630° C. (a temperature corresponding to a glass viscosity of $10^{13.7}$ poise). However, as soon as the previous molding cycle was completed, the mold assembly 15 was heated by the heater 19 to the press temperature 700° C. (a temperature corresponding to a glass viscosity of $10^{8.5}$ poise) (a lapse of two minutes in FIG. 6). The glass preform 1 and the ring holder 2 were heated by the heater 19 upon placing them on the molding assembly 15 (the lapse of one minute in FIG. 6), reaching the press temperature of the assembly 15 when three minutes had elapsed therefrom (a lapse of four minutes in FIG. 6).

When the glass preform 1, the ring holder 2, and the mold assembly 15 were heated to substantially 700° C. (the lapse of four minutes in FIG. 6), the upper and lower molds 13 and 14 were respectively moved downward and upward to the press position by the push rods 17 and 18. A load was applied to the push rod 17 while the lower mold 14 was fixed, thereby pressing the glass preform 1 at a pressure of 40 kg/cm² for 30 seconds (a period between the 4th to 4.5th minutes in FIG. 6). Thereafter, the load applied with the push rod 17 was released from the upper mold 13. The mold assembly 15 was cooled to a glass transformation temperature of 640° C. (a temperature corresponding to a glass viscosity of $10^{13}$ poise) at a cooling rate of 24° C./min while the glass molded body 21 was covered with the upper and lower molds 13 and 14 and held therebetween. The upper and lower molds 13 and 14 were then moved backward by the push rods 17 and 18 such that the glass molding surfaces 132 and 142 of the upper and lower molds 13 and 14 were separated from both concave surfaces of the glass molded body 21 (a lapse of seven minutes in FIG. 6).

As shown in FIG. 1, the transfer tool 7 was moved forward to cause the partition plate 703 to seal the reception chamber 3 off from the intermediate chamber 6. The ring holder 2 supporting the glass molded body 21 was delivered by the push rod 9 from the press chamber 4 and was transferred into the intermediate chamber 6 through the rails 11 and 10. The ring holder 2 was then placed on the second table 702 of the transfer tool 7. Meanwhile, the first table 701 of the transfer tool 7 was inserted in the sealed reception chamber 3. Another ring holder 2 (a temperature of about 200° C.) supporting the next glass preform 1 (room temperature) was placed on the first table 701, and the gas mixture was filled in the reception chamber 3.

As shown in FIG. 2, the transfer tool 7 was withdrawn and the glass molded body 21 placed on the ring holder 2 supported on the second table 702 was transferred to the rapid cooling/delivery chamber 5. The glass molded body 21 was rapidly cooled in the chamber 5 to a temperature of about 250° C. Thereafter, the glass molded body 21 was removed from the chamber 5. Meanwhile, the ring holder 2 supporting the next glass preform 1 was transferred into the intermediate chamber 5. This glass preform was transferred into the press chamber 4 in the same manner as described above and was molded by the mold assembly 15. The molded body was transferred to the second table 702 in the intermediate chamber 6 and then into the rapid cooling/delivery chamber 5. Finally, the glass molded body was delivered from the chamber 5.

In Example 1, the glass molded bodies 21 could be continuously molded with high precision. In particular, when the temperature of the mold assembly 15 was decreased from the press temperature of 700° C. to about 630° C., the ring holder 2 supporting the glass preform 1 was placed in the mold assembly 15. The glass preform 1 was molded at the press temperature of 700° C. and then cooled to about 640° C. The mold assembly 15 was then used at the temperature of about 630° C. for molding of the next perform. In other words, the temperature cycle of the mold assembly 15 involved a temperature difference of 70° C. between about 630° C. and 700° C. within a lapse of seven minutes. Compared with the conventional molding cycle of more than 30 minutes, the total cycle time could be greatly shortened.

EXAMPLE 2

Meniscus lenses each having a diameter of 5.2 mm and a central thickness of 1.5 mm were continuously molded using glass preforms 1. In Example 2, each glass preform was a disk of optical glass SF 6 (a glass transformation temperature of 432° C.) containing a large amount of PbO. Each disk had a diameter of 5.1 mm and a thickness of 1.8 mm.

In a molding apparatus used in Example 2, the shapes of ring holders 2 and a mold assembly 15 were suitable for both the preforms 1 and glass molded bodies 21 as meniscus lenses. The molding apparatus in Example 2 was substantially the same as that in Example 1, except that a through hole 124 (broken lines in FIG. 3) was formed in the wall surface slightly below the stepped surface 121 of the sleeve 12 so as to provide sufficient ventilation between the lower interior of the mold assembly 15 below the glass preform 1 and the exterior thereof, and that the gas was $N_2$ gas containing several ppms of $O_2$.

The procedures in Example 2 were identical with those in Example 1, except in that the temperature of the mold assembly 15 was about 460° C. upon placing of the glass preform 1 thereon since the mold assembly 15 was being heated to the press temperature, in that the press temperature was 535° C. corresponding to a glass viscosity of $10^8$ poise, a cooling rate was 40° C./min, and in that the cooled temperature in the interior of the mold assembly 15 was about 435° C. corresponding to a glass viscosity of $10^{12.7}$ poise.

In Example 2, the temperature cycle of the mold assembly 15 was repeated between about 435° C. and 535° C. The total cycle time required for molding could be greatly shortened, as in Example 1. In addition, the resultant glass molded body 21, i.e., a meniscus lens had high precision. The ring holder 2 supporting the glass preform 1 was placed inside the mold assembly 15, and the glass preform 1, the ring holder 2, and the mold assembly 15 were kept at the press temperature (535° C.). In addition, the upper and lower interior spaces in the mold assembly 15 with respect to the glass preform 1 were ventilated through openings 122 and 123 and the through holes 124 in the sleeve 12 immediately before the upper and lower molds 13 and 14 were moved to their press positions, thereby preventing reduction of PbO.

The present invention is not limited to the particular embodiment described with reference to the accompanying drawings. In Examples 1 and 2, the temperature differences were respectively 60° C. and 100° C. between the press temperatures and the cooled temperatures. However, the temperature difference may fall within the range of about 20° C. to 150° C. according to the kinds of glass. The temperature of the glass preform 1 to be placed in the reception chamber 3 and the press chamber 4 (i.e., in the mold assembly 15) was room temperature. However, the glass preform 1 may be preheated to 200° C. (a maximum of 300° C.). The through holes 124 were formed in the side wall surface of the sleeve 12 to achieve good ventilation. However, as indicated by the broken lines in FIG. 4, a through hole 202 or a through hole 203 may be formed in the side wall surface of the ring holder 2 above the stepped surface 201 thereof or in the side wall surface thereof between the stepped surface 201 and the bottom surface. Ventilation achieved through the openings 122 and 123 of the sleeve 12 may be replaced with that of a through hole 125 formed at the side wall (FIG. 3) of the sleeve 12 slightly above the opening 123. The ventilation through hole 124, 202, 203 or 125 may be a plurality of holes. In Examples 1 and 2, the resistor heater 19 was used. However, induction heating may be utilized in place of resistance heating. In addition, when a rotary system may be adapted to repeat heating and cooling of a large number of mold assemblies 15 according to the method of the present invention, the total molding time can be expected to be greatly shortened. In Example 1, one glass molded body was prepared using a single mold assembly. However, a plurality of glass molded bodies may be molded by a plurality of mold assemblies at the same time.

According to the molding method of the present invention, a long temperature cycle is provided to a glass preform and a ring holder of small heat capacity. A short temperature cycle is provided to a mold assembly of large heat capacity. Therefore, a total molding time can be greatly shortened and thermal efficiency can be greatly improved.

Compared with the conventional method wherein the glass preform is heated while it is in direct contact with the glass molding surface of the lower mold, the method of the present invention achieves long service life of the lower mold since the ring holder supporting the glass preform is supported and heated on the stepped surface of the holder. In addition, in the case of formation of ventilation openings or through holes in the sleeve or through hole with ring holder, a ventilation effect between the interior and exterior of the mold assembly can be maintained immediately before the mold assembly is held in the press position, thereby preventing reduction of PbO.

According to the method of the present invention, therefore, the glass molded bodies which do not require polishing after molding can be continuously manufactured with high precision.

What is claimed is:

1. A method of molding a glass body, comprising the steps of:

placing a glass preform between upper and lower molds of a mold assembly, the upper and lower molds being located opposite each other;

heating the mold assembly and glass preform to a predetermined heating temperature falling within a heating temperature range corresponding to a glass viscosity range of the glass preform of $10^8$ to $10^{10.5}$ poise;

applying a pressure high enough to mold the glass preform between the upper and lower molds when the glass preform is heated at the predetermined heating temperature, so that an unfinished glass molded body is formed from the glass preform;

releasing the pressure after the pressurization for a predetermined period of time at the predetermined temperature and gradually cooling the unfinished glass molded body and the mold assembly to a predetermined cooling temperature falling within a cooling temperature range corresponding to a glass viscosity range of $10^{11.5}$ to $10^{14}$ poise while the unfinished glass molded body is held in a ring holder in the mold assembly;

releasing a glass molded body with the ring holder from the mold assembly;

placing the next glass preform held in the ring holder and kept in the temperature range between the room temperature and 300 degrees between the upper and lower molds of the mold assembly kept in a temperature range between the predetermined cooling temperature and the predetermined heating temperature, the difference between the said predetermined cooling and heating temperature being within the range of 20 degrees C. to 150 degrees C.;

and performing steps of heating, pressure-applying, pressure releasing, cooling, and releasing of the glass molded body, in a single heating chamber whereby glass molded bodies are provided continuously by supplying glass preform continuously.

2. A method according to claim 1, wherein a difference between the heating and cooling predetermined temperature falls within a range of 20 degrees in centigrade to 150 degrees in centigrade.

3. A method according to claim 1, wherein the glass preforms is kept at a temperature range from room temperature to about 300 degrees in centigrade immediately before it is placed in the mold assembly.

4. A method according to claim 1, wherein the glass preform is supported in the ring holder, and the ring holder is placed between the upper and lower molds of the mold assembly.

5. A method according to claim 4, wherein the upper and lower molds of the mold assembly respectively have projections extending from bodies thereof, the ring holder is constituted by two portions of different inner diameters, and the glass preform is placed on a stepped portion of the ring holder, which is formed between the two portions of the different inner diameters, one of the two portions of the different inner diameters being adapted to correspond to an outer diameter of the projection of the upper mold, and the other being adapted to correspond to an outer diameter of the projection of the lower mold, the projections of the upper and lower molds being respectively accommodated in two portions of different diameters, and the pressure being applied between the upper and lower molds to mold the glass preform placed on the stepped portion of the ring holder.

6. A method according to claim 1, wherein the body of the upper mold constituting the mold assembly has a larger diameter than that of the body of the lower mold, the bodies of the upper and lower molds are slidably accommodated inside a sleeve, and insertion/transfer openings are formed in an intermediate portion of the sleeve to insert or transfer the ring holder supporting the glass preform.

7. A method according to claim 6, wherein there is provided communicating means for causing a space between the upper mold and a ring holder supporting the glass preform in the sleeve and a space between the lower mold and the ring holder to communicate with the exterior of the mold assembly.

8. A method according to claim 7, wherein the communicating means comprises a hole formed in the ring holder.

9. A method according to claim 7, wherein the communicating means comprises a hole formed in a wall surface of the sleeve.

* * * * *

UNITED STATES PATENT AND TRADEMARK OFFICE
CERTIFICATE OF CORRECTION

PATENT NO. : 4,778,505

DATED : 10/18/88

INVENTOR(S) : Hirota et al.

It is certified that error appears in the above-identified patent and that said Letters Patent is hereby corrected as shown below:

| Column | Line | |
|---|---|---|
| 1 | 63 | delete "assemmbly", insert --assembly-- |
| 2 | 8 | delete "boy", insert --body-- |
| Abstract | 3 | delete "assembly. The mold", insert --assembly. The upper and lower molds are located opposite each other. The mold-- |
| Abstract | 11 | delete "formed.", insert --formed from the glass preform.-- |
| Abstract | 16 | delete "assembly.", insert --assembly. The next glass preform is placed between the upper and lower molds of the mold assembly kept in a temperature between the predetermined cooling temperature and the predetermined heating temperature.-- |

UNITED STATES PATENT AND TRADEMARK OFFICE
CERTIFICATE OF CORRECTION

PATENT NO. : 4,778,505

DATED : 10/18/88

INVENTOR(S) : Hirota et al.

Page 2 of 2

It is certified that error appears in the above-identified patent and that said Letters Patent is hereby corrected as shown below:

Steps of heating, pressure-applying, pressure releasing, cooling, and release of the glass molded body are performed, whereby glass molded bodies are provided continuously by supplying glass preforms continuously.--

Signed and Sealed this

Eleventh Day of July, 1989

Attest:

DONALD J. QUIGG

*Attesting Officer*

*Commissioner of Patents and Trademarks*